United States Patent
Tan et al.

(10) Patent No.: US 9,390,857 B2
(45) Date of Patent: Jul. 12, 2016

(54) FILM CAPACITOR

(75) Inventors: Daniel Qi Tan, Rexford, NY (US);
Patricia Chapman Irwin, Altamont, NY (US); Yang Cao, Niskayuna, NY (US); Qin Chen, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 916 days.

(21) Appl. No.: 12/241,136

(22) Filed: Sep. 30, 2008

(65) Prior Publication Data
US 2010/0079926 A1    Apr. 1, 2010

(51) Int. Cl.
*H01G 4/06* (2006.01)
*H01G 4/20* (2006.01)

(52) U.S. Cl.
CPC ............... *H01G 4/206* (2013.01); *H01G 4/06* (2013.01); *H01G 4/20* (2013.01)

(58) Field of Classification Search
CPC ................................ H01G 4/206; H01G 4/20
USPC ......................................................... 361/311
See application file for complete search history.

(56) References Cited

U.S. PATENT DOCUMENTS

| | | | |
|---|---|---|---|
| 3,638,084 A * | 1/1972 | Burn | 361/320 |
| 4,468,432 A | 8/1984 | Matsukura et al. | |
| 4,695,921 A * | 9/1987 | Robbins | 361/308.2 |
| 4,917,810 A | 4/1990 | Tsunooka et al. | |
| 5,043,843 A * | 8/1991 | Kimura et al. | 361/308.1 |
| 5,490,035 A | 2/1996 | Yen et al. | |
| 5,555,219 A | 9/1996 | Akiyama et al. | |
| 5,638,251 A | 6/1997 | Goel et al. | |
| 5,650,031 A | 7/1997 | Bolon et al. | |
| 5,739,193 A * | 4/1998 | Walpita et al. | 524/413 |
| 5,858,533 A * | 1/1999 | Greuter et al. | 428/404 |
| 5,936,832 A * | 8/1999 | Saito et al. | 361/321.4 |
| 5,951,908 A | 9/1999 | Cui et al. | |
| 5,962,122 A | 10/1999 | Walpita et al. | |
| 6,083,628 A | 7/2000 | Yializis | |
| 6,544,651 B2 | 4/2003 | Wong et al. | |
| 6,577,493 B2 * | 6/2003 | Honda et al. | 361/311 |
| 6,594,134 B2 * | 7/2003 | Yializis | 361/305 |
| 6,630,234 B1 * | 10/2003 | Tanisho et al. | 428/323 |
| 6,632,109 B2 | 10/2003 | Irwin et al. | |
| 6,762,237 B2 | 7/2004 | Glatkowski et al. | |
| 6,778,053 B1 | 8/2004 | Irwin et al. | |
| 6,835,889 B2 | 12/2004 | Hiraoka et al. | |
| 6,864,306 B2 | 3/2005 | Rao et al. | |

(Continued)

FOREIGN PATENT DOCUMENTS

| | | |
|---|---|---|
| CN | 1670073 | 9/2005 |
| CN | 1797770 A | 7/2006 |

(Continued)

OTHER PUBLICATIONS

EP Search Report, EP06124499, Feb. 27, 2007.

(Continued)

*Primary Examiner* — Eric Thomas
(74) *Attorney, Agent, or Firm* — Ann M. Agosti

(57) ABSTRACT

A capacitor comprises a substrate layer, a first electrode layer disposed on the substrate layer, and a first dielectric layer disposed on the electrode layer. The dielectric layer comprises inorganic ferroelectric or antiferroelectric particles, and a polymeric material having an elongation less than or equal to about 5 percent.

23 Claims, 3 Drawing Sheets

(56) References Cited

U.S. PATENT DOCUMENTS

| | | |
|---|---|---|
| 7,267,840 B2 | 9/2007 | Ohnishi et al. |
| 7,567,426 B2 | 7/2009 | Ko et al. |
| 8,779,047 B2 | 7/2014 | Koh et al. |
| 2002/0176989 A1* | 11/2002 | Knudsen et al. ............ 428/408 |
| 2003/0017351 A1 | 1/2003 | Hayashi et al. |
| 2004/0060730 A1 | 4/2004 | Lauf et al. |
| 2004/0183434 A1* | 9/2004 | Yeh et al. .................. 313/506 |
| 2004/0265551 A1 | 12/2004 | Takaya et al. |
| 2005/0080175 A1 | 4/2005 | Paik et al. |
| 2005/0161149 A1 | 7/2005 | Yokota et al. |
| 2005/0219793 A1* | 10/2005 | Matsuda et al. .......... 361/321.2 |
| 2005/0256240 A1 | 11/2005 | Nelson |
| 2006/0051601 A1* | 3/2006 | Natori et al. ................ 428/469 |
| 2006/0138590 A1* | 6/2006 | Suzuki et al. ............... 257/532 |
| 2006/0140031 A1 | 6/2006 | Kijima et al. |
| 2006/0185140 A1* | 8/2006 | Andresakis et al. ......... 29/25.41 |
| 2007/0049485 A1 | 3/2007 | Tanabe et al. |
| 2007/0116976 A1 | 5/2007 | Tan et al. |
| 2007/0117886 A1 | 5/2007 | Tan et al. |
| 2007/0117898 A1 | 5/2007 | Tan et al. |
| 2007/0117913 A1 | 5/2007 | Tan et al. |
| 2007/0177331 A1 | 8/2007 | Das et al. |
| 2007/0258190 A1 | 11/2007 | Irwin et al. |
| 2008/0073621 A1* | 3/2008 | Suzuki et al. ............... 252/513 |
| 2008/0123250 A1 | 5/2008 | Tan et al. |
| 2009/0207555 A1* | 8/2009 | Hackenberger et al. ... 361/321.5 |

FOREIGN PATENT DOCUMENTS

| | | |
|---|---|---|
| EP | 0936641 | 8/1999 |
| EP | 0969488 A2 | 5/2000 |
| EP | 1271578 A2 | 2/2003 |
| EP | 1791195 | 5/2007 |
| EP | 2133893 | 12/2009 |
| JP | 01205411 A | 8/1989 |
| JP | 02062023 A * | 3/1990 ............ H01G 4/12 |
| JP | 3116918 A | 5/1991 |
| JP | 10507705 A | 7/1998 |
| JP | 1154366 A | 2/1999 |
| JP | 2001319826 A | 11/2001 |
| JP | 2003100553 A | 4/2003 |
| JP | 2007126661 A | 5/2007 |
| JP | 2007134354 A | 5/2007 |
| WO | WO0079550 A1 | 12/2000 |
| WO | WO0189827 A1 | 11/2001 |
| WO | 03054259 | 7/2003 |
| WO | 2005093763 A1 | 10/2005 |
| WO | WO2006124670 | 11/2006 |
| WO | 2008013048 A1 | 1/2008 |

OTHER PUBLICATIONS

CN1670073, English Abstract, D. Lijie et al., Sep. 21, 2005.

JP58141222, Publication Date Aug. 22, 1983, "High-Dielectric Film" (Abstract Only).

Colin Kydd Campbell, "Experimental and Theoretical Characterization of an Antiferroelectric Ceramic Capacitor for Power Electronics", IEEE Transactions on Components and Packaging Technologies, vol. 25, No. 2, pp. 211-216, Jun. 2002.

Jianwen Xu and C. P. Wong, "Low-loss percolative dielectric composite" Applied Physics Letters 87, 082907, pp. 082907-1, 2, 3, 2005.

Y. Bai, Z. Y. Cheng, V. Bharti, H. A. Xu, and Q M. Zhang, "High-dielectric constant ceramic-powder polymer composites", Applied Physics Letters, vol. 76, No. 25, pp. 3804-3806, published Apr. 28, 2000.

E. Aulagner, J. Guillet, G. Seytre, C. Hantouche, P. Le Gonidec, G. Terzulli, "(PVDF/BaTiO3) and (PP/BaTiO3) Films for Energy Storage Capacitors" 1995 IEEE 5th International Conference on Conduction and Breakdown in Solid Dielectrics, pp. 423-427, 1995.

D. Dimos, "Perovskite Thin Films for High-Frequency Capacitor Applications", Annual Review of Materials Science, vol. 28: 397-419 (Volume publication date Aug. 1998).

P. F. Fantoni, A. Nordlund, "Wire System Aging Assessment and Condition Monitoring" Nordic Nuclear Safety Research, Apr. 2006.

M. L. Krogh, B. C. Schultz, W. Huebner et al., "High Breakdown Strength, Multilayer Ceramics for Compact Pulsed Power Applications", Federal Manufacturing & Technologies, Jul. 1999.

M. T. Lanagan, J. H. Kim, S. Jang, R. E. Newnham, "Microwave Dielectric Properties of Antiferroelectric Lead Zirconate", J. Am. Ceram. Soc., 71(4) pp. 311-316 (1988).

M. P. McNeal, S. Jang, R. E. Newnham, "Particle Size Dependent High Frequency Dielectric Properties of Barium Titanate", ISAF '96, Proceedings of the Tenth IEEE International Symposium on Applications of Ferroelectrics, Aug. 1996.

EP09169857 Search Report, Jan. 22, 2010.

Ramesh et al., "Dielectric Nanocomposites for Integral Thin Film Capacitors: Materials Design, Fabrication and Integration Issues", IEEE Transactions on Advanced Packaging, vol. No. 26, Issue No. 1, pp. 17-24, Feb. 2003.

Windlass et al., "Polymer-Ceramic Nanocomposite Capacitors for System-On-Package (SOP) Applications", IEEE Transactions on Advanced Packaging, vol. No. 26, Issue No. 1, pp. 10-16, Feb. 2003.

Office Action issued in connection with corresponding CN Application No. 200910205780.2 on Feb. 23, 2012.

Unofficial English translation of Office Action issued in connection with corresponding JP Application No. 2009-218353 on Jan. 20, 2015.

* cited by examiner

FILM CAPACITOR

FIELD OF THE INVENTION

The invention includes embodiments that relate to a capacitor. More particularly, the invention includes embodiments that relate to a film capacitor.

BACKGROUND OF THE INVENTION

Film capacitors are typically constructed by co-winding displaced, metallized polymer films. The polymer films must be sufficiently ductile to ensure proper winding of the films, and the use of weak or brittle film material is not possible. Accordingly, in the electronics industry, as well as in the automotive industry, aviation industry, oil and gas well exploration, there is a need for capacitors which may comprise weak or brittle polymers, yet still exhibit a high dielectric constant, high breakdown strength, as well as good mechanical strength.

BRIEF SUMMARY OF THE INVENTION

In one embodiment, a capacitor comprises a substrate layer, a first electrode layer disposed on the substrate layer, and a first dielectric layer disposed on the electrode layer. The dielectric layer comprises a polymeric material having an elongation less than or equal to about 5 percent, and inorganic ferroelectric or antiferroelectric particles.

In another embodiment, a capacitor comprises a substrate layer comprising cellulose triacetate, wherein the substrate layer has a tensile strength of greater than or equal to about 300 psi. A first electrode layer is disposed on the substrate layer, and a first dielectric layer is disposed on the electrode layer. The dielectric layer comprises inorganic ferroelectric or antiferroelectric particles, and a polymeric material having an elongation less than or equal to about 5 percent.

DETAILED DESCRIPTION OF THE INVENTION

Disclosed herein are film capacitors with improved dielectric and mechanical properties. Some of the dielectric properties considered herein are dielectric constant, breakdown voltage, and loss factor. The "dielectric constant" of a dielectric is a ratio of capacitance of a capacitor in which the space between and around the electrodes is filled with the dielectric, to the capacitance of the same configuration of electrodes in a vacuum. As used herein, "dielectric breakdown voltage" refers to a measure of the dielectric breakdown resistance of a material under an applied AC or DC voltage. The applied voltage just before breakdown is divided by thickness of the dielectric to give the breakdown voltage. It is measured in kV/mm. In an ideal dielectric, the voltage wave and the current wave are 90 degrees out of phase. In a real dielectric as the dielectric becomes less than 100% efficient, the current wave begins to lag the voltage in direct proportion. This results in a proportional power loss in the dielectric. The extent to which the current wave deviates from being 90 degrees out of phase with the voltage is defined as the dielectric loss angle. The tangent of this loss angle is known as the loss factor or dissipation factor.

Figure 1:
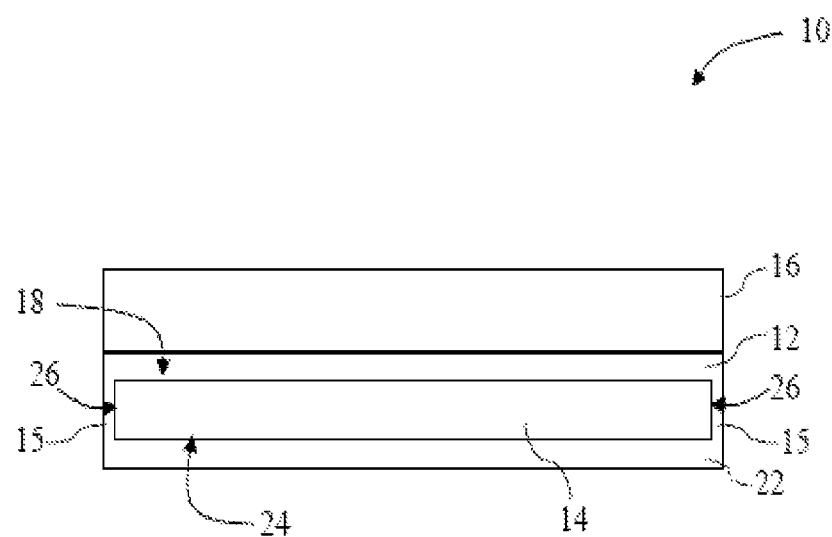
FIG. 1 is a cross-sectional view of a film capacitor in accordance with an embodiment of the invention.

Referring to FIG. 1, shown is a film capacitor 10 comprising a first electrode layer 12 disposed on and supported by a substrate layer 14. In one embodiment, the substrate layer 14 is a polymer film, and the first electrode layer 12 disposed on the substrate layer forms a metalized polymer film. The metallized polymer film comprised of the substrate layer 14 and first electrode layer 12, is used as a substrate to provide sufficient mechanical strength and flexibility for one or more dielectric layers to be deposited. The metallized polymer film substrate also provides mechanical support to the dielectric layer(s) during the processing steps which form the capacitor. Suitable materials the substrate layer 14 may be comprised of include, but are not limited to polyetherimide, cellulose triacetate, polyphenyl sulfone, polyester, polyimide, polyetheretherketone, or a combination thereof. In a preferred embodiment, the substrate layer 14 is comprised of cellulose triacetate.

The tensile strength of the substrate layer 14 is one measure of the flexibility and ductility of the substrate layer. It is desirable for the substrate layer 14 to have a tensile strength of greater than or equal to about 3,000 psi. In another embodiment, the substrate layer 14 has a tensile strength greater than or equal to about 5,000 psi. In another embodiment, the substrate layer 14 has a tensile strength greater than or equal to about 7,000 psi. In yet another embodiment, the substrate layer 14 has a tensile strength greater than or equal to about 9,000 psi.

The elongation of the substrate layer 14 is preferably greater than or equal to about 2 percent. In one embodiment, the elongation of the substrate layer 14 is greater than or equal to about 5 percent. In another embodiment, the elongation of the substrate layer 14 is greater than or equal to about 10 percent. In yet another embodiment, the elongation of the substrate layer 14 is greater than or equal to about 50 percent.

A first dielectric layer 16 is disposed on the first electrode layer 12. The dielectric layer 16 may be deposited on the electrode layer 12 by any method known to those having skill in the art, including but not limited to solvent casting, spin coating, dip coating, or gravure coating. The gravure coating process relies on an engraved roller running in a coating bath, which fills the engraved dots or lines of the roller with the coating material. The excess coating on the roller is wiped off by a doctor blade and the coating is then deposited onto a substrate, such as the metallized polymer carrier film described herein. The coating material may be comprised of a dielectric material that is dissolved in a proper solvent.

The electrode layer 12 may be deposited on the substrate layer 14 by thermal evaporation, physical vapor deposition or sputtering or chemical vapor deposition. If desired, a first electrode layer may 12 be deposited on a first surface 18 of the substrate layer 14, and a second electrode layer 22 may be deposited on a second opposing surface 24 of the substrate layer. The side surfaces 26 of the substrate layer 14 may also be metallized such that the substrate layer 14 is essentially disposed within a single metallization layer, as shown in FIG. 1. The metallization layer 15 deposited on the side surfaces 26 of the substrate layer 14 is comprised of the same material the electrode layers 12 and 22 are made from. After depositing the electrode layer(s) 12 and 22 on the substrate layer 14, the first dielectric layer 16 can be deposited on the first electrode layer as described above.

Figure 2:
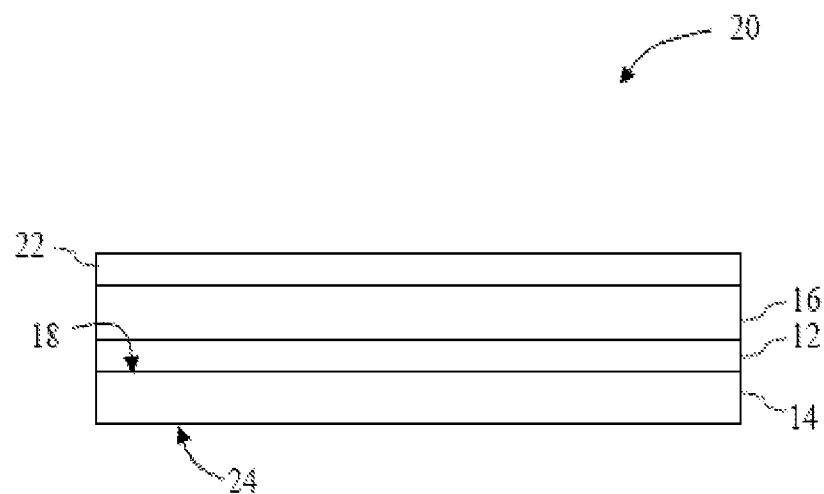
FIG. 2 is a cross-sectional view of a film capacitor in accordance with an alternative embodiment of the invention.

FIG. 2 illustrates an embodiment of a film capacitor 20 wherein a first electrode layer 12 is deposited on the first surface 18 of the substrate layer 14. The metallized polymer film comprised of the substrate layer 14 and first electrode layer 12, is used as a substrate to provide sufficient mechanical strength and flexibility for one or more dielectric layers to be deposited. The metallized polymer film substrate also provides mechanical support to the dielectric layer(s) during the processing steps which form the capacitor. A first dielectric layer 16 is then deposited on the first electrode layer 12, wherein the first electrode layer is disposed between the substrate layer 14 and the first dielectric layer. A second electrode layer 22 is deposited on the first dielectric layer 16, wherein the first dielectric layer is disposed between the first and second electrode layers 12 and 22.

Figure 3:
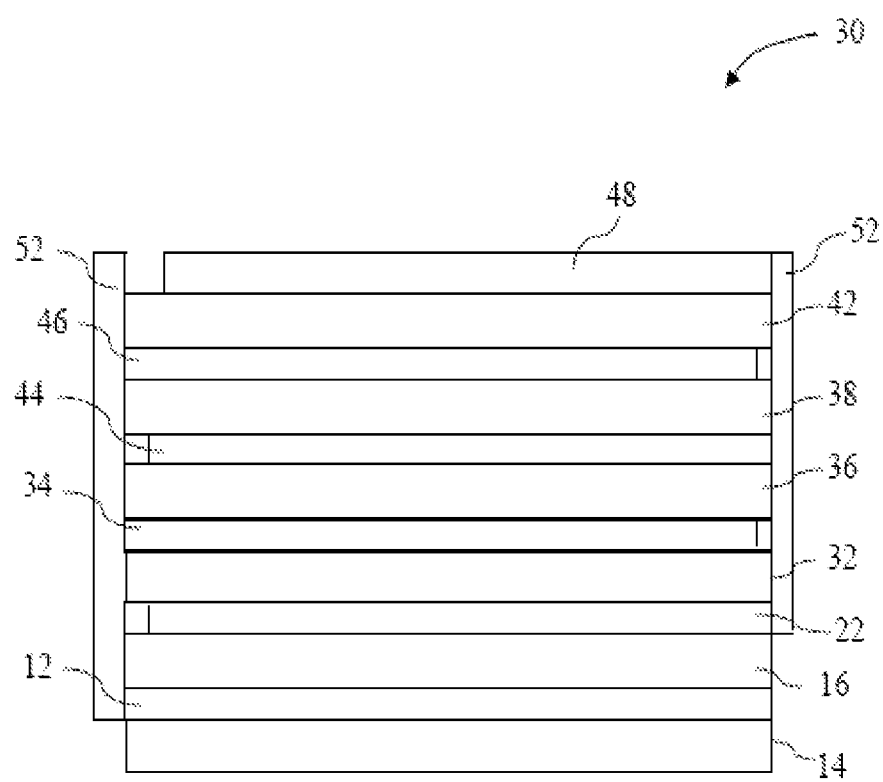
FIG. 3 is a cross-sectional view of multilayered film capacitor in accordance with an alternative embodiment of the invention.

If desired, additional electrode and dielectric layers may be added to form a multilayered capacitor film 30, as illustrated in FIG. 3. For example, a second dielectric layer 32 is deposited on the second electrode layer 22, wherein the second electrode layer is disposed between the first and second dielectric layers 16 and 32. A third electrode layer 34 is deposited on the second dielectric layer 32, whereby the second dielectric layer is disposed between the second and third electrode layers 22 and 34. Additional dielectric layers 36, 38, and 42 and electrode layers 44, 46 and 48 are formed in this alternating manner, wherein each dielectric layer is located between two electrode layers. The dielectric layers and electrode layers are deposited as described hereinabove.

A terminating metallization layer 52 should be deposited on the side surfaces of the capacitor film 30 as the lead electrode for capacitor connection purposes, as shown in FIG. 3. Suitable methods for depositing the metallization layer 52 include plasma spray techniques and the methods described herein as suitable for depositing the electrode.

The dielectric layer typically has a thickness between about 0.1 microns and about 20 microns. In one embodiment, the dielectric layer has a thickness in a range between about 5 microns and about 15 microns. In yet another embodiment of the invention, the dielectric layer has a thickness in a range between about 10 microns and about 15 microns.

The electrode layer typically has a thickness in a range between about 20 angstroms and about 300 angstroms. In one embodiment, the electrode layer has a thickness in a range between about 30 angstroms and about 150 angstroms. In yet another embodiment of the invention, the electrode layer has a thickness in a range between about 50 angstroms and about 100 angstroms.

The substrate layer 14 may have a thickness between about 0.1 micron and about 15 microns. In one embodiment, the substrate layer has a thickness in a range between about 1 micron and about 10 microns. In yet another embodiment of the invention, the substrate layer has a thickness in a range between about 3 microns and about 5 microns.

In the embodiments of the invention, the electrode layer or metallization layer may be comprised of aluminum, copper, zinc, or a combination thereof. In a preferred embodiment, the electrode layer comprises at least one of aluminum, copper or zinc foil. More preferably, the electrode layer comprises aluminum or an aluminum zinc alloy. In another preferred embodiment, the metallization layer is comprised of aluminum.

In one embodiment, the dielectric layer includes a weak and brittle polymeric material that has high permittivity and breakdown strength. As used herein, "polymeric material" refers only to the polymeric material present in the dielectric layer, unless otherwise indicated. The polymeric material and dielectric layer typically have a breakdown voltage that is at least 100 kilovolts/millimeter. In one embodiment, the polymeric material and dielectric layer have a breakdown voltage that is at least 300 kilovolts/millimeter. In another embodiment, the polymeric material and dielectric layer have a breakdown voltage that is at least 450 kilovolts/millimeter. In another embodiment, the polymeric material and dielectric layer have a breakdown voltage that is at least 600 kilovolts/millimeter.

The polymeric material may comprise polymers selected from a wide variety of thermoplastic polymers, thermosetting polymers, blends of thermoplastic polymers, blends of thermosetting polymers, or blends of thermoplastic polymers with thermosetting polymers. The polymeric material can comprise a homopolymer, a copolymer such as a star block copolymer, a graft copolymer, an alternating block copolymer or a random copolymer, ionomer, dendrimer, or a combination comprising at least one of the foregoing. The polymeric material may also be a blend of polymers, copolymers, or the like, or a combination comprising at least one of the foregoing.

Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylene terephthalates, polyvinylidene fluorides, polysiloxanes, polyphenylene ether, cyanoethyl cellulose, cellulose triacetate, or the like, or a combination comprising at least one of the foregoing thermoplastic polymers.

Exemplary thermoplastic polymers include polyetherimide, polyvinylidene fluoride, polyvinylidine fluoride-trifluoroethylene P(VDF-TrFE), polyvinylidene-tetrafluoroethylene copolymers P(VDF-TFE), and polyvinylidine hexafluoropropylene copolymers P(VDF-HFP), epoxy, polyester, polyimide, polyarylate, polyphenylsulfone, polystyrene, polyethersulfone, polyamideimide, polyurethane, polycarbonate, polyetheretherketone, polyphenylene ether, cyanoethyl cellulose, cyanoethyl pullulan, cellulose triacetate, or the like, or a combination comprising at least one of the foregoing.

Examples of blends of thermoplastic polymers include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, cellulosic cyanoresin/cellulose triacetate, cyanoethyl pullulan/polyvinylidine fluoride or the like, or a combination comprising at least one of the foregoing. In a preferred embodiment, the polymeric material is a cellulosic cyanoresin.

Examples of thermosetting polymers that can be used in the polymeric material are resins of epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, thermosetting polyphenylene ether, silicone, fluorosilicone, benzimidazoles, cyanate esters, bismaleimides, reactive dicyclopentadiene resin, reactive polyamides, or the like, or a combination comprising at least one of the foregoing.

In one embodiment, suitable thermosetting polymers include thermosetting polymers that can be made from an energy activatable thermosetting pre-polymer composition. Examples include polyurethanes such as urethane polyesters, silicone polymers, phenolic polymers, amino polymers, epoxy polymers, bismaleimides, polyimides, and furan polymers. The energy activatable thermosetting pre-polymer component can comprise a polymer precursor and a curing agent. The polymer precursor can be heat activated, eliminating the need for a catalyst. The curing agent selected will not only determine the type of energy source needed to form the thermosetting polymer, but may also influence the resulting properties of the thermosetting polymer. Examples of curing agents include aliphatic amines, aromatic amines, acid anhydrides, peroxides, lewis acids or the like, or a combination comprising at least one of the foregoing. The energy activatable thermosetting pre-polymer composition may include a solvent or processing aid to lower the viscosity of the composition for ease of extrusion including higher throughputs and lower temperatures. The solvent could help retard the crosslinking reaction and could partially or totally evaporate during or after polymerization. The solvent could also act as a reactive diluent, acting as a viscosity aid before cure and reacting into the final polymer during the curing process.

It is desirable for the polymeric material to have a glass transition or softening temperature of greater than or equal to about 120 degrees Celsius. In one embodiment, it is desirable for the polymeric material to have a glass transition or softening temperature of greater than or equal to about 150 degrees Celsius. In another embodiment, it is desirable for the polymeric material to have a glass transition or softening temperature of greater than or equal to about 200 degrees Celsius. In yet another embodiment, it is desirable for the polymeric material to have a glass transition or softening temperature of greater than or equal to about 260 degrees Celsius.

In one embodiment, the polymeric material is present in an amount of about 5 to about 99.999 weight percent of the total weight of the dielectric layer. In another embodiment, the polymeric material is present in an amount of about 10 weight percent to about 99.99 weight percent of the total weight of the dielectric layer. In another embodiment, the polymeric material is present in an amount of about 30 weight percent to about 99.5 weight percent of the total weight of the dielectric layer. In another embodiment, the polymeric material is present in an amount of about 50 weight percent to about 99.3 weight percent of the total weight of the dielectric layer.

In one embodiment, the elongation of the polymeric material is less than or equal to about 2 percent. In one embodiment, the elongation of the polymeric material is less than or equal to about 5 percent. In another embodiment, the elongation of the polymeric material is less than or equal to about 10 percent. In another embodiment, the elongation of the polymeric material is less than or equal to about 50 percent. In yet another embodiment, the elongation of the polymeric material is less than or equal to about 100 percent.

In the embodiments of the invention, the dielectric layer includes a nanocomposite material comprising the polymeric material and inorganic ferroelectric or antiferroelectric particles dispersed within the polymeric material. The polymeric material provides a matrix for the particles.

The inorganic antiferroelectric particles can be converted to ferroelectric particles upon the application of an activating field. In one embodiment, the activating field can comprise a biasing electrical field. In another embodiment, the activating field can comprise a biasing electric field that is applied in the presence of a source of thermal energy, such as, for example, an oven. Thus, the antiferroelectric particles are field-tunable, nonlinear dielectric particles that can undergo a phase transition from a low dielectric state (antiferroelectric state) to a high dielectric state (ferroelectric state) upon being exposed to a biasing electric field. These advantageous properties of the antiferroelectric particles permit the dielectric layer to be field tunable. Field tunable dielectric layers can advantageously have their dielectric properties adjusted upon demand depending upon the application for which they are to be used.

The ferroelectric effect is an electrical phenomenon whereby certain ionic crystals may exhibit a spontaneous dipole moment. There are two main types of ferroelectrics, displacive and order-disorder. For example, the effect in barium titanate (BT) and strontium titanate (ST), is of the displacive type and is due to a polarization catastrophe, in which, if an ion is displaced from equilibrium slightly, the force from the local electric fields due to the ions in the crystal increases faster than the elastic restoring forces. This leads to an asymmetrical shift in the equilibrium ion positions and hence to a permanent dipole moment. In an order-disorder ferroelectric, there is a dipole moment in each unit cell, but at high temperatures they are pointing in random directions. Upon lowering the temperature and going through the phase transition, the dipoles order, all pointing in the same direction within a domain.

As a result of the aforementioned ordering that occurs in ferroelectric materials, these materials have a high dielectric constant of greater than or equal to about 1000. Their dielectric constant of the ferroelectric particles may decrease as the particles are exposed to an increasing electric field. In an antiferroelectric transition individual dipoles become arranged anti-parallel to adjacent dipoles with the result that the net spontaneous polarization is zero. Thus materials in their antiferroelectric states generally have a lower dielectric constant of about 100 to about 1000. Both the ferroelectric and the antiferroelectric particles can exist in the form of nanoparticles or micrometer sized particles. These nanoparticles generally have a dielectric constant that is moderately higher than the dielectric constant of the polymeric material. This permits a higher electric field penetration into the nanoparticles resulting in higher dielectric constant in the nanocomposite dielectric layer.

As noted above, the antiferroelectric particles intrinsically undergo a phase transition from being antiferroelectric to ferroelectric upon the application of an electric field. The antiferroelectric particles upon being dispersed in the polymeric material can be triggered to undergo a phase transition from the antiferroelectric state to the ferroelectric state upon the application of an electrical field of less than or equal to about 100 kilovolts/millimeter. As a result, the dielectric constant of the polymeric nanocomposite would be increased by an amount of greater than or equal to about 300 percent when compared with a polymeric material that does not contain the antiferroelectric particles.

The antiferroelectric particles can be advantageously dispersed in the polymeric material in order to increase the dielectric constant of the dielectric layer. The well-dispersed particles within the polymeric material provide improved properties over a polymeric material that does not contain the antiferroelectric particles. These improved properties include a higher dielectric constant, higher energy densities, good breakdown strength, corona resistance, improved impact strength and mechanical hardness, as well as thermal stability.

The antiferroelectric particles are generally between their antiferroelectric and ferroelectric state prior to incorporating them into the dielectric layer. It is generally desirable for the antiferroelectric particles in the antiferroelectric state to have a dielectric constant that is as close as possible to the dielectric constant of the polymeric material. In one embodiment, the antiferroelectric particles (in the antiferroelectric state) have a dielectric constant whose value is within 10 percent of the value of the dielectric constant of the polymeric material. In another embodiment, the antiferroelectric particles (in the antiferroelectric state) have a dielectric constant whose value is within 50 percent of the value of the dielectric constant of the polymeric material. In yet another embodiment, the antiferroelectric particles (in the antiferroelectric state) have a dielectric constant whose value is within 100 percent of the value of the dielectric constant of the polymeric material. In yet another embodiment, the antiferroelectric particles (in the antiferroelectric state) have a dielectric constant whose value is within 500 percent of the value of the dielectric constant of the polymeric material. Examples of antiferroelectric particles are those derived from perovskite.

In one embodiment, the antiferroelectric particle is one that has the formula (I) $Pb(M_1, M_2, M_3, \ldots)O_3$ (I) where $M_1$, $M_2$, $M_3$, are transition metals or rare earth metals. Examples of transition metals are those present in groups 3d, 4d and 5d of the periodic table, such as, of example, scandium, iron, titanium chromium, zirconium, or the like, or a combination comprising at least one of the foregoing transition metals. Examples of rare earth metals are lanthanum, cerium, neodymium, gadolinium, samarium, or the like, or a combination comprising at least one of the foregoing rare earth metals.

An example of a ferroelectric or antiferroelectric particle is one that comprises lead zirconium titanate (PZT) shown in the formula (II) below: $Pb(Zr_xTi_{1-x})O_3$ (III) where x is less than or equal to about 1. In one embodiment, x can have a value of about 0.3 to about 1. In another embodiment, x can have a value of about 0.6 to about 1. In yet another embodiment, x can have a value of about 0.9 to about 1. The PZT antiferroelectric particles exist in the form of a solid solution that spans a wide compositional space and, consequently, a wide range of dielectric properties. The phase boundaries and electrical properties of PZT can also be further modified by doping. For example, substitution of $La^{3+}$ for $Pb^{2+}$ can lead to ferroelectric particles with a dielectric constant up to 7000 that can be converted into antiferroelectric particles. Examples of PZT and PZT derivatives include $PbHfO_3$, $PbZrO_3$, modified $Pb(ZrTi)O_3$, $PbLa(ZrSnTi)O_3$, $PbNb(ZrSnTi)O_3$, or the like, or a combination comprising at least one of the foregoing antiferroelectric particles. An exemplary antiferroelectric particle is lead zirconate ($PbZrO_3$).

Another example of an antiferroelectric particle is one that comprises lead lanthanum zirconium titanates (PLZT) in formula (III): $Pb_{1-x}La_x(Zr_yTi_{1-y})_{1-x/4}O_3$ (III) where x and y can each have a value of up to 1 respectively and wherein x and y are independent of each other. In one embodiment, x can have a value of about 0.1 to about 0.3, while y can have a value of about 0.8 to about 1.

Yet another example of an antiferroelectric particle is one that comprises lead scandium niobates (PSN) in formula (IV) or lead scandium tantalate (PST) in formula (V): $PbSc_xNb_{1-y}O_3$ (IV) $PbSc_xTa_{1-x}O_3$ (V).

Other antiferroelectric particles are $PbSc_{1/2}Nb_{1/2}O_3$—$PbLu_{1/2}Nb_{1/2}O_3$, $SrTiO_3$—$PbZrO_3$, lead scandium niobium titanate (PSNT) and lead lutetium niobium titanate (PLuNT).

In another embodiment, the antiferroelectric particles are lead-free. Examples of antiferroelectric particles include $NaNbO_3$, $(K,Na)(Nb,Ta)O_3$, $KNbO_3$, $BaZrO_3$, $Na_{0.25}K_{0.25}Bi_{0.5}TiO_3$, $Ag(Ta,Nb)O_3$ and $Na_{0.5}Bi_{0.5}TiO_3$—$K_{0.5}Bi_{0.5}TiO_3$—$BaTiO_3$, $(Bi_{1-x}Sm_x)FeO_3$, where x and y is an amount of up to about 1 respectively and wherein x and y are independent of each other, or a combination comprising at least one of the foregoing lead-free antiferroelectric particles.

As noted above, the particles can undergo a phase transition from a low dielectric constant (antiferroelectric state) to a high dielectric constant (ferroelectric state) when subjected to an electrical biasing field. In one embodiment, the antiferroelectric particles can undergo a phase transition from an antiferroelectric (low dielectric constant) state to a ferroelectric (high dielectric constant) state when subjected to an electrical biasing field of greater than or equal to about 4 kilovolts/millimeter (kV/mm). In one embodiment, the antiferroelectric particles can undergo a phase transition from an antiferroelectric (low dielectric constant) state to a ferroelectric (high dielectric constant) state when subjected to an electrical biasing field of greater than or equal to about 60 kilovolts/millimeter (kV/mm). In yet another embodiment, the antiferroelectric particles that can undergo a phase transition from an antiferroelectric (low dielectric constant) state to a ferroelectric (high dielectric constant) state when subjected to an electrical biasing field of greater than or equal to about 200 kilovolts/millimeter (kV/mm).

In one embodiment, the dielectric constant of the dielectric layer increases by greater than or equal to 50 percent upon the phase transition. In another embodiment, the dielectric constant of the dielectric layer increases by greater than or equal to 100% upon the phase transition. In another embodiment, the dielectric constant of the dielectric layer increases by greater than or equal to 500 percent upon the phase transition.

As noted above, the ferroelectric or antiferroelectric particles can have particle sizes in the nanometer range ($10^{-9}$ meter range) or micrometer range ($10^{-6}$ meter range). In one embodiment, the ferroelectric or antiferroelectric particles have particle sizes of about 5 nanometers to about 10 micrometers. In another embodiment, the ferroelectric or antiferroelectric particles have particle sizes of about 10 nanometers to about 1 micrometer. In another embodiment, the ferroelectric or antiferroelectric particles have particle sizes of about 20 nanometers to about 500 nanometers. In yet another embodiment, the ferroelectric or antiferroelectric particles have particle sizes of about 40 nanometers to about 200 nanometers.

In one embodiment, the particles can be surface treated to facilitate bonding with the polymeric material. In one embodiment, the surface treatment comprises coating the particles with a silane-coupling agent, or if desired, a phosphonic acid may be used to surface treat the particles. Examples of suitable silane-coupling agents include tetramethylchlorosilane, hexadimethylenedisilazane, gamma-aminopropoxysilane, or the like, or a combination comprising at least one of the foregoing silane coupling agents. The silane-coupling agents generally enhance compatibility of the ferroelectric or antiferroelectric particles with the polymeric material, and phosphonic acid promotes the formation of strong bonds between the ferroelectric or antiferroelectric particles and the coupling agent. These functionalizing agents can improve dispersion of the ferroelectric or antiferroelectric particles within the polymeric material.

As noted above, the ferroelectric or antiferroelectric particles have at least one dimension in the nanometer or micrometer range. It is generally desirable for the ferroelectric or antiferroelectric particles to have an average largest dimension that is less than or equal to about 10 micrometers. The dimension may be a diameter, edge of a face, length, or the like. The ferroelectric or antiferroelectric particles may have shapes whose dimensionalities are defined by integers, e.g., the ferroelectric or antiferroelectric particles are either 1, 2 or 3-dimensional in shape. They may also have shapes whose dimensionalities are not defined by integers (e.g., they may exist in the form of fractals). The ferroelectric or antiferroelectric particles may exist in the form of spheres, flakes, fibers, whiskers, or the like, or a combination comprising at least one of the foregoing forms. The ferroelectric or antiferroelectric particles may have cross-sectional geometries that may be circular, ellipsoidal, triangular, rectangular, polygonal, or a combination comprising at least one of the foregoing geometries. The ferroelectric or antiferroelectric particles, as commercially available, may exist in the form of aggregates or agglomerates prior to incorporation into the polymeric material or even after incorporation into the polymeric material. An aggregate comprises more than one particle in physical contact with one another, while an agglomerate comprises more than one aggregate in physical contact with one another.

Regardless of the exact size, shape and composition of the ferroelectric or antiferroelectric particles, they may be dispersed within the polymeric material at loadings of about 0.1 to about 85 weight percent of the total weight of the dielectric layer when desired. In one embodiment, the ferroelectric or antiferroelectric particles are present in an amount of greater than or equal to about 1 weight percent of the total weight of the dielectric layer. In another embodiment, the ferroelectric or antiferroelectric particles are present in an amount of greater than or equal to about 10 weight percent of the total weight of the dielectric layer. In yet another embodiment, the ferroelectric or antiferroelectric particles are present in an amount of greater than or equal to about 30 weight percent of the total weight of the dielectric layer. In one embodiment, the ferroelectric or antiferroelectric particles are present in an amount of less than or equal to 85 weight percent of the total weight of the dielectric layer. In another embodiment, the ferroelectric or antiferroelectric particles are present in an amount of less than or equal to about 70 weight percent of the total weight of the dielectric layer. In yet another embodiment, the ferroelectric or antiferroelectric particles are present in an amount of less than or equal to about 60 weight percent of the total weight of the dielectric layer.

The polymeric material together with the ferroelectric or antiferroelectric particles and any other optionally desired organic fillers may generally be combined in several different ways such as, but not limited to compounding, melt blending, solution blending, or the like, or a combination comprising at least one of the foregoing methods. Melt blending of these components involves the use of shear force, extensional force, compressive force, ultrasonic energy, electromagnetic energy, thermal energy or a combination comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or a combination comprising at least one of the foregoing.

Melt blending involving the aforementioned forces may be conducted in machines such as, but not limited to, single or multiple screw extruders, Buss kneader, Henschel, helicones, Ross mixer, Banbury, roll mills, molding machines such as injection molding machines, vacuum forming machines, blow molding machine, or then like, or a combination comprising at least one of the foregoing machines. It is generally desirable during melt or solution blending of the composition to impart a specific energy of about 0.01 to about 10 kilowatt-hour/kilogram (kwhr/kg) of the composition. Within this range, a specific energy of greater than or equal to about 0.05, preferably greater than or equal to about 0.08, and more preferably greater than or equal to about 0.09 kwhr/kg is generally desirable for blending the composition. Also desirable is an amount of specific energy less than or equal to about 9, preferably less than or equal to about 8, and more preferably less than or equal to about 7 kwhr/kg for blending the composition.

The particles can be in the antiferroelectric state or the ferroelectric state prior to incorporation into the polymeric material. In general, it is desirable for the particles to be in the antiferroelectric state prior to use in a particular application. As noted above, a biasing electric field of less than or equal to about 100 kilovolts/millimeter is generally used to change the state of the antiferroelectric particles (from the antiferroelectric state to the ferroelectric state) that are incorporated into the polymers. This biasing electric field can be accompanied by the application of heat to the sample. Heat may be applied in the form of convection, conduction or radiation to the sample during the application of a biasing electrical field.

In one embodiment, the polymeric material is in powder form, pellet form, sheet form, or the like, may be first dry blended with the ferroelectric or antiferroelectric particles and other optional fillers if desired in a Henschel or a roll mill, prior to being fed into a melt blending device such as an extruder or Buss kneader. In another embodiment, the ferroelectric or antiferroelectric particles are introduced into the melt blending device in the form of a masterbatch. In such a process, the masterbatch may be introduced into the melt blending device downstream of the polymeric material.

When a masterbatch is used, the ferroelectric or antiferroelectric particles may be present in the masterbatch in an amount of about 10 weight percent to about 85 weight percent, of the total weight of the masterbatch. In one embodiment, the ferroelectric or antiferroelectric particles are used in an amount of greater than or equal to about 30 weight percent of the total weight of the masterbatch. In another embodiment, the ferroelectric or antiferroelectric particles are used in an amount of greater or equal to about 40 weight percent, of the total weight of the masterbatch. In another embodiment, the ferroelectric or antiferroelectric particles are used in an amount of greater than or equal to about 45 weight percent, of the total weight of the masterbatch. In one embodiment, the ferroelectric or antiferroelectric particles are used in an amount of less than or equal to about 85 weight percent, of the total weight of the masterbatch. In another embodiment, the ferroelectric or antiferroelectric particles are used in an amount of less than or equal to about 75 weight percent, of the total weight of the masterbatch. In another embodiment, the ferroelectric or antiferroelectric particles are used in an amount of less than or equal to about 65 weight percent, of the total weight of the masterbatch.

The composition comprising the polymeric material, optional organic fillers, and ferroelectric or antiferroelectric particles may be subject to multiple blending and forming steps if desirable to form the dielectric layer. For example, the composition may first be extruded and formed into pellets. The pellets may then be fed into a molding machine where it may be formed into other desirable shapes. Alternatively, the composition emanating from a single melt blender may be formed into sheets or strands and subjected to post-extrusion processes such as annealing, uniaxial or biaxial orientation.

Solution blending may also be used to manufacture the composition. The solution blending may also use additional energy such as shear, compression, ultrasonic vibration, or the like to promote homogenization of the particles with the polymeric material. In one embodiment, a polymeric material suspended in a fluid (e.g., a solvent) may be introduced into an ultrasonic sonicator along with the ferroelectric or antiferroelectric particles. The mixture may be solution blended by bead milling followed by sonication for a time period effective to break up and disperse the ferroelectric or antiferroelectric particles within the polymeric material and the fluid. The polymeric material along with the ferroelectric or antiferroelectric particles may then be dried, extruded and molded if desired. It is generally desirable for the fluid to swell the polymeric material during the process of sonication. Swelling the polymeric material generally improves the ability of the ferroelectric or antiferroelectric particles to be impregnated with the polymeric material during the solution blending process and consequently improves dispersion.

In another embodiment related to solution blending, the ferroelectric or antiferroelectric particles are sonicated together with polymeric material precursors. The polymeric material precursors are generally monomers, dimers, trimers, or the like, which can be reacted into polymeric materials. A fluid such as a solvent may optionally be introduced into the sonicator with the ferroelectric or antiferroelectric particles and the polymeric material precursors. The time period for the sonication is generally an amount effective to promote encapsulation of the ferroelectric or antiferroelectric particles by the polymeric material precursors. After the encapsulation, the polymeric material precursor is then polymerized to form a composition within which is dispersed the ferroelectric or antiferroelectric particles.

Suitable examples of monomers that may be used to facilitate this method of encapsulation and dispersion are those used in the synthesis of polymers such as, but not limited to polyacetals, polyacrylics, polycarbonates, polystyrenes, polyesters, polyamides, polyamideimides, polyarylates, polyurethanes, polyarylsulfones, polyethersulfones, polyarylene sulfides, polyvinyl chlorides, polysulfones, polyetherimides, polytetrafluoroethylenes, polyetherketones, polyether etherketones, or the like, or a combination comprising at least one of the foregoing. In one embodiment, the mixture of polymeric material precursors, fluid and/or the particles is sonicated for a period of about 1 minute to about 24 hours. In another embodiment, the mixture is sonicated for a period of greater than or equal to about 5 minutes. In another embodiment, the mixture is sonicated for a period of greater than or equal to about 10 minutes. In another embodiment, the mixture is sonicated for a period of greater than or equal to about 15 minutes. In one embodiment, the mixture is sonicated for a period of less than or equal to about 15 hours. In another embodiment, the mixture is sonicated for a period of less than or equal to about 10 hours. In another embodiment, the mixture is sonicated for a period of and more preferably less than or equal to about 5 hours.

Solvents may optionally be used in the solution blending of the composition. The solvent may be used as a viscosity modifier, or to facilitate the dispersion and/or suspension of particles. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone (NMP), or the like, or a combination comprising at least one of the foregoing solvents may be used. Polar protic solvents such as water, methanol, acetonitrile, nitromethane, ethanol, propanol, isopropanol, butanol, or the like, or a combination comprising at least one of the foregoing polar protic solvents may be used. Other non-polar solvents such as benzene, toluene, methylene chloride, carbon tetrachloride, hexane, diethyl ether, tetrahydrofuran, or the like, or a combination comprising at least one of the foregoing solvents may also be used if desired. Co-solvents comprising at least one aprotic polar solvent and at least one non-polar solvent may also be used. In one embodiment, the solvent is xylene or n-methylpyrrolidone.

If a solvent is used, it may be utilized in an amount of about 1 to about 90 weight percent, of the total weight of the composition. In one embodiment, if a solvent is used, it may be utilized in an amount of about 2 to about 50 weight percent, of the total weight of the composition. In yet another embodiment, if a solvent is used, it may be utilized in an amount of about 3 to about 30 weight percent, of the total weight of the composition. In yet another embodiment, if a solvent is used, it may be utilized in an amount of about 5 to about 20 weight percent, of the total weight of the composition. It is generally desirable to evaporate the solvent before, during and/or after the blending of the composition.

After solution blending, the solution comprising the desired composition can be cast, spin cast, dip coated, spray painted, brush painted and/or electrostatically spray painted onto a desired substrate, such as an electrode layer. The solution is then dried leaving behind the dielectric layer on the substrate surface. In another embodiment, the solution comprising the desired composition may be spun, compression molded, injection molded or blow molded to form a dielectric layer.

Blending can be assisted using various secondary species such as dispersants, binders, modifiers, detergents, and additives. Secondary species may also be added to enhance one to more of the properties of the composition. Blending can also be assisted by pre-coating the particles with a thin layer of the polymeric material or with a phase that is compatible with the polymeric material, such as, for example a silane layer or a phosponic acid layer.

In one embodiment, a composition comprising the polymeric material and the ferroelectric or antiferroelectric particles in random orientations and locations may be subjected to an electrical field in order to orient the ferroelectric or antiferroelectric particles. The application of the electrical field can be conducted when the composition is in the melt state or in a solution. Solidification can occur in the presence of the electrical field. Upon being subjected to the electrical field, the ferroelectric or antiferroelectric particles can be re-aligned into preferred orientation. In one embodiment, the electric field can be used to align these particles into columnar structure so as to give rise to higher dielectric constant.

A dielectric layer comprising the polymeric material and the antiferroelectric particles in a low dielectric constant state has advantages over a dielectric layer comprising the polymeric material alone. In one embodiment, the dielectric layer has a dielectric constant that is at least 10 percent greater than a dielectric layer comprising polymeric material alone. In another embodiment, the dielectric layer has a dielectric constant that is at least 50 percent greater than the polymeric material alone. In another embodiment, the dielectric layer has a dielectric constant that is at least 100 percent greater than the polymeric material alone.

Upon applying an electrical field for converting the antiferroelectric particles to ferroelectric particles, the dielectric layer can have a dielectric constant that is at least 200 percent greater than the polymeric material alone. In one embodiment, upon conversion, the dielectric layer has a dielectric constant that is at least 300 percent greater than a dielectric layer comprising polymeric material alone. In another embodiment, upon conversion, the dielectric layer has a dielectric constant that is at least 400 percent greater than the polymeric material alone. In another embodiment, upon conversion, the dielectric layer has a dielectric constant that is at least 500 percent greater than the polymeric material alone.

Dielectric layers that comprise the nanoparticles may also be optically transparent. In one embodiment, the dielectric layers have a transmissivity to visible light of greater than or equal to about 70 percent. In another embodiment, the dielectric layers have a transmissivity to visible light of greater than or equal to about 80 percent. In yet another embodiment, the dielectric layers have a transmissivity to visible light of greater than or equal to about 90 percent. In yet another embodiment, the dielectric layers have a transmissivity to visible light of greater than or equal to about 95 percent. In yet another embodiment, the dielectric layer also has a Class A surface finish when molded. Molded articles can be manufactured by injection molding, blow molding, compression molding, or the like, or a combination comprising at least one of the foregoing.

In one embodiment, the dielectric layer has a corona resistance that is resistant to a current of about 1000 volts to 5000 volts applied for about 200 hours to about 2000 hours. In another embodiment, the dielectric layer has a corona resistance that is resistant to a current of about 1000 volts to 5000 volts applied for about 250 hours to about 1000 hours. In yet another embodiment, the dielectric layer has a corona resistance that is resistant to a current of about 1000 volts to 5000 volts applied for about 500 hours to about 900 hours.

The dielectric layer has a dielectric constant greater than or equal to about 3 when measured at frequencies of about 1 to about $10^6$ hertz (Hz). In one embodiment, the dielectric layer has a dielectric constant greater than or equal to about 5 when measured at frequencies of about 1 to about $10^6$ hertz (Hz). In another embodiment, the dielectric layer has a dielectric constant greater than or equal to about 10 when measured at frequencies of about 1 to about $10^6$ hertz (Hz). In another embodiment, the dielectric layer has a dielectric constant greater than or equal to about 20 when measured at frequencies of about 1 to about $10^6$ hertz (Hz). In yet another embodiment, the dielectric layer has a dielectric constant greater than or equal to about 50 when measured at frequencies of about 1 to about $10^6$ hertz (Hz).

It is desirable for the dielectric layer to have a glass transition or softening point temperature of greater than or equal to about 100 degrees Celsius. In one embodiment, the dielectric layer has a glass transition or softening point temperature of greater than or equal to about 120 degrees Celsius. In another embodiment, the dielectric layer has a glass transition or softening point temperature of greater than or equal to about 150 degrees Celsius. In another embodiment, the dielectric layer has a glass transition or softening point temperature of greater than or equal to about 180 degrees Celsius. In yet another embodiment, the dielectric layer has a glass transition or softening point temperature of greater than or equal to about 200 degrees Celsius.

Furthermore, the dielectric layer may have a loss factor below 0.02. In a preferred embodiment, the dielectric layer has a loss factor below 0.005.

The capacitors described herein are useful for a broad range of applications such as power conversion, power conditioning and pulsed power applications. The film capacitors are particularly useful in high temperature environments. The capacitors described herein typically have an operating temperature in a range between about −40 degrees Celsius and about 200 degrees Celsius. In another embodiment, the capacitor has an operating temperature in a range between about 0 degree Celsius and about 150 degrees Celsius. In yet another embodiment of the invention, the capacitor has an operating temperature in a range between about 20 degrees Celsius and about 120 degrees Celsius.

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A capacitor film comprising a metallized polymer support layer and one or more dielectric layers wherein the metallized polymer support layer is comprised of:
   a substrate layer; and
   a first electrode layer disposed directly on the substrate layer;
wherein a first dielectric layer is disposed directly on the first electrode layer, the first dielectric layer comprising a thermoplastic polymeric material and at least one of inorganic ferroelectric or antiferroelectric particles,
whereby the first electrode layer separates the substrate from the first dielectric layer and wherein the thermoplastic polymeric material is formed prior to application thereof directly onto the first electrode layer by blending a thermoplastic polymer and at least one of inorganic ferroelectric or antiferroelectric particles and,
   wherein the thermoplastic polymeric material has an elongation less than or equal to about 5 percent and
   wherein all of the inorganic ferroelectric or antiferroelectric particles present in the capacitor film are present in the one or more dielectric layers.

2. The capacitor of claim 1, wherein the electrode layer comprises aluminum, copper, zinc, or a combination thereof.

3. The capacitor of claim 1, wherein the thermoplastic polymer comprises a cellulosic cyanoresin.

4. The capacitor of claim 1, wherein the substrate layer comprises any of polyetherimide, cellulose triacetate, polyphenyl sulfone, polyimide, polyetheretherketone, or a combination thereof.

5. The capacitor of claim 1, wherein the substrate layer is a film.

6. The capacitor of claim 1, wherein the ferroelectric or antiferroelectric particles have a dielectric loss factor below 0.02.

7. The capacitor of claim 1, wherein the ferroelectric or antiferroelectric particles comprise a perovskite.

8. The capacitor of claim 1, wherein the ferroelectric or antiferroelectric particles have the general formula (I) $Pb(M_1, M_2, M_3, \ldots)O_3$ (I) where $M_1$, $M_2$, $M_3$, are transition metals or rare earth metals.

9. The capacitor of claim 1, wherein the ferroelectric or antiferroelectric particles comprise lead zirconium titanate (PZT) having the formula (II): $Pb(Zr_xTi_{1-x})O_3$ (II) where x is an amount of up to about 1.

10. The capacitor of claim 1, wherein the ferroelectric or antiferroelectric particles comprise $PbHfO_3$, $PbZrO_3$, modified $Pb(ZrTi)O_3$, $PbLa(ZrSnTi)O_3$, $PbNb(ZrSnTi)O_3$, or a combination comprising at least one of the foregoing particles.

11. The capacitor of claim 1, wherein the ferroelectric or antiferroelectric particles comprise lead lanthanum zirconium titanates (PLZT) having the formula (III): $Pb_{1-x}La_x(Zr_yTi_{1-y})_{1-x/4}O_3$ (III) where x and y is an amount of up to about 1 respectively and wherein x and y are independent of each other.

12. The capacitor of claim 1, wherein the ferroelectric or antiferroelectric particles comprise lead scandium niobates (PSN) having the formula (IV) or lead scandium tantalate (PST) having the formula (V): $PbSc_xNb_{1-y}O_3$ (IV) $PbSc_xTa_{1-x}O_3$ (V) where x is an amount of up to about 1.

13. The capacitor of claim 1, wherein the ferroelectric or antiferroelectric particles comprise lead scandium niobium titanate (PSNT), lead lutetium niobium titanate (PLuNT), or a combination comprising at least one of the foregoing particles.

14. The capacitor of claim 1, wherein the ferroelectric or antiferroelectric particles comprise at least one of $NaNbO_3$, $(K,Na)(Nb,Ta)O_3$, $KNbO_3$, $BaZrO_3$, $Na_{0.25}K_{0.25}Bi_{0.5}TiO_3$, $Ag(Ta,Nb)O_3$, $Na_{0.5}Bi_{0.5}TiO_3$—$K_{0.5}Bi_{0.5}TiO_3$—$BaTiO_3$, $(Bi_{1-x}Sm_x)FeO_3$, or a combination thereof where x is an amount of up to about 1.

15. The capacitor of claim 1, wherein the thermoplastic polymeric material has an elongation less than or equal to about 2 percent.

16. The capacitor of claim 1, wherein the first dielectric layer has a dielectric constant of greater than or equal to about 3.

17. The capacitor of claim 1, wherein the capacitor has an operating temperature in a range between about −40 degrees Celsius and about 200 degrees Celsius.

18. The capacitor of claim 1, further comprising:
a second electrode layer, wherein the first dielectric layer is disposed between the first electrode layer and the second electrode layer.

19. The capacitor of claim 18, further comprising:
a second dielectric layer on the second electrode layer; and
a third electrode layer, wherein the second dielectric layer is disposed between the second electrode layer and the third electrode layer.

20. The capacitor of claim 19, wherein the capacitor further comprises:
a top surface,
a bottom surface, wherein the substrate layer is disposed proximate the bottom surface;
at least two side surfaces; and
a terminating metallization layer disposed on at least a portion of the side surfaces.

21. The capacitor of claim 20, wherein the metallization layer comprises aluminum, copper, zinc, or a combination thereof.

22. The capacitor of claim 1, wherein the substrate layer comprises a first surface and a second surface, and wherein the capacitor further comprises:
a second electrode layer disposed on the second surface of the substrate layer.

23. The capacitor of claim 22, wherein the substrate layer comprises at least two side surfaces adjacent the first surface and second surface, and wherein the capacitor further comprises:
a metallization layer disposed on at least a portion of the side surfaces.

* * * * *